April 4, 1950     W. H. KITTO     2,502,655
ELECTRIC TOASTER

Filed May 17, 1947     2 Sheets-Sheet 1

INVENTOR.
William H. Kitto
BY
Harry S. Dumas
ATTORNEY.

April 4, 1950  W. H. KITTO  2,502,655
ELECTRIC TOASTER
Filed May 17, 1947  2 Sheets-Sheet 2

INVENTOR.
William H. Kitto
BY
Harry S. Dinasee
ATTORNEY.

Patented Apr. 4, 1950

2,502,655

UNITED STATES PATENT OFFICE 2,502,655

ELECTRIC TOASTER

William H. Kitto, Chicago, Ill., assignor to The Hoover Company, North Canton, Ohio, a corporation of Ohio Application May 17, 1947, Serial No. 748,729

12 Claims. (Cl. 99—329)

The present invention relates to electric bread toasters although the toaster may be used for heating or toasting various forms of comestibles. More particularly, the present invention discloses closure means and/or slot covers for a toaster in combination with a thermal timing mechanism adapted for timing the duration of a toasting interval either with the toaster slot covers in position or with the toaster slots uncovered. The present invention is an improvement over the thermal timing mechanism for timing the duration of the toasting interval as disclosed and claimed in a copending U. S. application, Ser. No. 725,556 of Eugene L. Snyder et al., filed January 31, 1947 and which is assigned to a common assignee, The Hoover Company, a corporation of Ohio.

According to the present invention, the various difficulties with regard to thermal timers and other faults encountered have been remedied by providing a thermal timer in which the toasting operation is not terminated until the thermal timing element has cooled to a predetermined temperature. This will always assure that the thermal timing element is at its proper temperature at the beginning of each toasting operation which is found particularly advantageous in toasting devices wherein the cooking and/or baking chamber or toasting chamber is covered in order to reduce the toasting period wherein the bread, for example, is toasted more uniformly, the resulting toast retaining more moisture.

In accordance with this invention the thermal timing element is heated by an auxiliary electrical heater energized simultaneously with the oven heater and then cooled to perform the timing function. When the thermal timing element reaches a pre-determined temperature it de-energizes the auxiliary heater and then cools to a pre-determined lower temperature whereupon it opens the main switch to de-energize the toaster and to release the toast carriage for movement to toast ejecting position. If soft toast is desired the slots are closed and the thermal timing element operates exactly as above described, however, an auxiliary mechanism prevents complete upward movement of the toast carriage until the operator uncovers the toast slots in the cover shell.

In accordance with this invention the auxiliary heater is moved toward and away from the thermal timing element depending upon whether the toaster slots are closed or opened, respectively. In either condition of the toast slots, variation in the timing period is accomplished by means of a rheostat which controls the heating rate of the auxiliary heater. The time required for the thermal element to cool after it has de-energized the auxiliary heater is unaffected by the rheostat adjusting mechanism hence the toasting interval is varied solely by varying the heating period of the thermal element.

Another important feature of this invention is the construction of the thermal timer itself. According to this invention, the preferred thermal timer includes a bimetallic strip supported at its ends on a pivoted member so that movement of the bimetal imparts movement to the pivoted member in one direction to actuate a switch for the auxiliary heater and in the reverse direction to deenergize the main heaters and to release the toast carriage.

It is within the purview of the invention to utilize the auxiliary holding mechanism to retain bread carriers in warming position even though slot covers are not utilized in connection with the toast slots in the cover shell.

According to another feature of this invention, partitions are provided dividing the toaster into a central toasting chamber, front and rear mechanism compartments and a bottom mechanism compartment. A plurality of latches are provided in the front mechanism compartment for holding the carriage in toasting position or warming position according to the setting of the control mechanism. The thermal timer and slot cover control are positioned in the rear mechanism compartment, and motion transmitting means are positioned in the bottom compartment for transmitting motion from the timer and closure controls to the latches which retain the toast carriage in lower toasting and warming position.

It is therefore a principal object of this invention to provide a toaster with a slot cover and/or closure means for a toasting chamber thereof which may be operated with the slot cover either opened or closed, means to speed up the timing mechanism for the toaster when the slot cover is closed, means to open the main heating circuit at the end of the toasting period and hold the toast in the toaster until the slot cover and/or covers are opened and releasing means whereby when the slot covers are opened the toast carriage is automatically released.

Other objects and advantages of this invention will become apparent as the description proceeds or taken in connection with the accompanying drawings, in which.

Figures 1, 2:
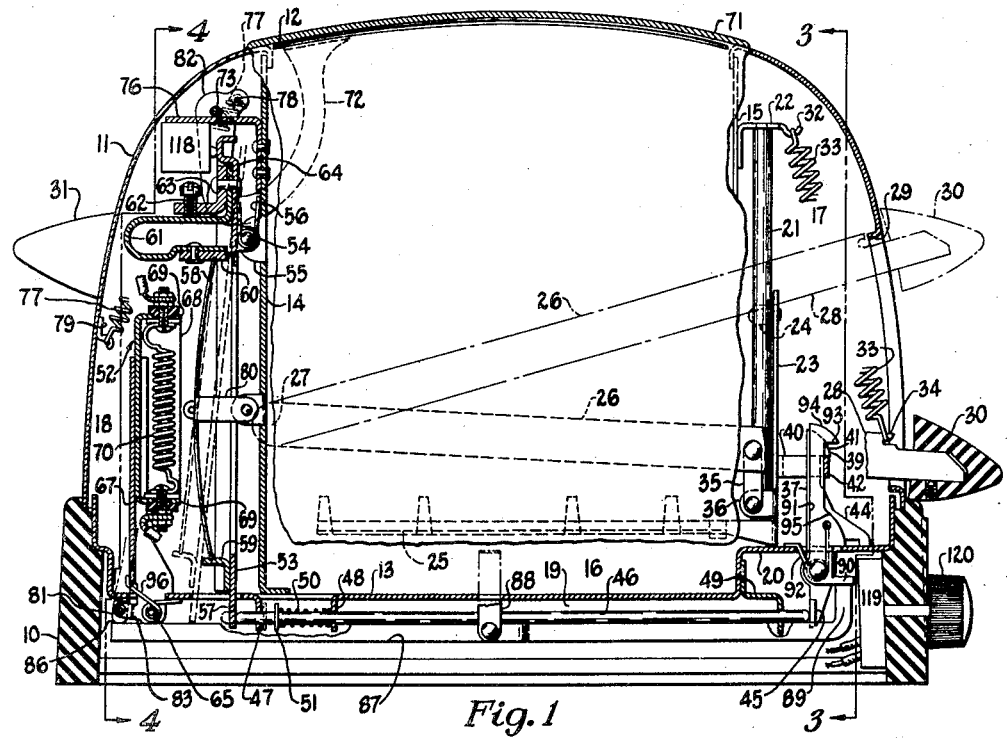
Figure 1 is a cross sectional view of the toaster showing the timing mechanism according to this invention in conjunction with a closure mechanism for the toasting chamber adapted to vary the speed of the timing mechanism if the toaster is used with or without the closure means.
Figure 2 is a plan view, partly in section, of the embodiment illustrated in Figure 1.

Referring to the drawings, the toaster forming the preferred embodiment of the invention is provided with a plastic base 10 with a cover and/or appearance housing 11 mounted thereon to cover the mechanism and toasting compartment. The appearance housing 11 is provided with two toast receiving openings 12, one of which is shown in Figure 1.

A base plate 13 is mounted on the base 10 and forms a support for the entire mechanism within the appearance housing 11.

Partitions 14 and 15 divide the toaster into a toasting chamber 16, front mechanism compartment 17 and rear mechanism compartment 18. The base plate 13 separates the toasting chamber 16 from a lower mechanism compartment 19.

Rigidly mounted upon an upwardly extending portion 20 of the base plate 13 are a pair of guide posts 21, one of which is shown in Figure 1 and rigidly attached to the partitions 15, Figure 1, by means of a bracket 22. The posts 21 form guides for a vertically reciprocating supporting plate 23 by means of a plurality of rollers as is well known in the art, which are shown at 24, Figure 3.

Figures 3, 4, 5, 6, 7:
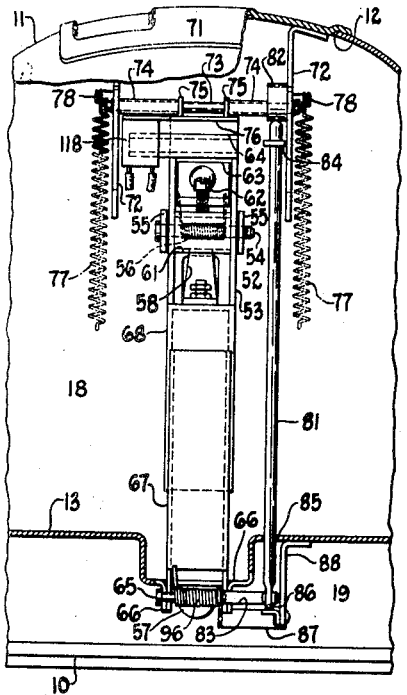
Figure 3 is a side elevation, partly in section, of the toaster of Figure 1 taken along line 3—3 looking in the direction of the arrows.
Figure 4 is a side elevation, partly in section, taken along line 4—4 of Figure 1 looking in the direction of the arrows illustrating the means to vary the timing mechanism of the toaster in the open and closed position of the closure means.
Figure 5 is a partial side elevation taken along lines corresponding to line 4—4 of the Figure 1 of a modification of the invention wherein the slot covers have an arcuate movement moving from open to closed position.
Figure 6 is a front elevation of the embodiment of Figure 5.
Figure 7 is a wiring diagram for the various embodiments of the toaster constructed according to this invention.

Rigidly attached to the bottom end of the supporting plate 23 are a pair of bread carriers 25, as shown in Figure 2. In order to manually reciprocate the supporting plate 23 and bread carriers 25 in upward and downward direction, a U-shaped lever is provided, arms 26 of which are shown in Figures 1 and 2. At their rear ends, the arms 26 which extend through slots 26' in the member 15, Figure 3, are pivoted to the toasting chamber wall 14 as shown at 27 on projections struck out from the wall 14 as shown in Figure 2, and at their front ends are extended forwardly as at 28 so as to extend through a slot 29 in the appearance housing 11. Secured to the extending portions 28 of the arms 26 is a manipulating handle 30 by which the toast carrier 25 may be moved downwardly to toasting position. At the opposite end of the toaster from the manipulating handle 30 is a second handle 31 secured to the appearance housing 11. When the toast carriers are in their upper position, the handles 30 and 31 may be utilized for carrying the toaster from place to place.

The bracket 22 is extended forwardly to form a hook 32 which forms the upper anchorage for a tension spring 33 which is secured at its lower end to a hook 34 on the extending portions 28 of the arms 26. The arms 26 are secured to the supporting plate 23 by means of links 35 pivoted at their ends to the arms 26 and at their lower ends to lugs 36 which are bent backwardly from the supporting plate 23.

Normally, the tension spring 33 spring-biases the arms 26 to their upper position and accordingly also spring-biases the bread carriers 25 and supporting plate 23 to their upward position.

In order to hold the bread carriers 25 in their lower toasting position, a latch 37 is pivoted on a pintle 38' mounted in lugs 38 affixed to the underneath of the portion 20 of the base plate 13, as shown in Figure 3. At its upper end, the latch 37 has a hook 39 which cooperates with a U-shaped member 40 extending forwardly from the supporting plate 23 to hold the supporting plate 23 in downward position. The latch is provided with a cam surface 41 which cooperates with the portion 42 of the lug 40 to move the latch 37 counter-clockwise against the bias of the spring 43 when the supporting plate 23 is moved to its downward position. When the hook 39 passes the portion 42 of the lug 40, the spring 43 projects the hook 39 above the portion 42 of the lug 40. In order to hold the latch 37 in a position so that the cam surface 41 will cooperate with the lugs 42, a stop 44 is provided which coacts with the plate 20 to hold the latch 37 in a substantially vertical position.

Below its pivot, the latch 37 is provided with an impact end 45 which cooperates with a reciprocating rod 46 mounted upon the bottom plate 13 by means of lugs 47, 48, and 49 so as to lie in the bottom mechanism compartment 19. A spring 50 coacts with a collar 51 and the projection 48 to normally spring-bias the actuating rod 46 toward the left so as to be out-of-contact with the impact end 45 of the latch 37 unless positively held in that position.

The timing mechanism generally indicated by the reference numeral 52, comprises a frame 53 pivotally mounted on a pintle 54 affixed in lugs 55 struck rearwardly from the partition 14. A spring 56 biases the frame 53 so that its impact end 57 presses against the rod 46 to hold the front end of the rod 46 against the impact end 45 of latch 37 in opposition to the bias of the spring 50 but with insufficient force to overcome the force of the spring 43 and the frictional force holding the latch 37 in latching position.

A bimetallic strip 58 is supported at its ends between an abutment 59 at the lower end of the frame 53 and an abutment 60 near its pivot point 54. The abutment 60 is mounted on the end of a U-shaped bimetallic strip 61 secured to the frame 53 by a rivet or other suitable securing means. A screw 62 is threaded through a bracket 63 secured to the upper end 64 of the frame 53 and is adapted to be adjusted to apply more or less pressure to the end of the bimetallic strip 58 and constitutes a factory adjustment. The purpose of the U-shaped bimetallic strip 61 will be described in more detail hereinafter.

The central portion of the bimetallic strip 58 is secured to the partition 14 by means of a link 80 so that the central portion of the bimetallic strip is substantially immovable relative to the pivot point 54 of the frame 53. Pivotally mounted on the pintle 65 on lugs 66 struck downwardly from the base plate 13 is a bracket 67 which carries a reflector 68. The ends of the reflector 68 are turned forwardly as shown at 69 and support an auxiliary heating coil 70. The bracket 67, reflector 68 and the heating coil 70 normally lie substantially in parallel relationship to the bimetallic strip 58 and are adapted to be moved toward and away from the bimetallic strip 58 depending upon whether a closure member 71 is in its downward position as shown in Figures 1 to 4, inclusive, or in its raised position. The closure member 71 is pivotally mounted for movement from its closed position as shown in Figure 1 to its raised position through hinged members 72 extending through slots in the partition 14, Figures 2 and 4, and journaled on a hinge pin 73 through tubular members 74 affixed to the hinge members 72. The hinge pin 73 is mounted on projections 75 struck from a supporting member 76 which is suitably affixed to the partition 14. The closure 71 for the toaster slots 12 is spring-biased in its raised and lowered position through springs 77 mounted at their upper ends on lugs 78 affixed to the hinge members 72 and at their lower ends affixed to lugs 79 which are affixed to the shell 11.

The manually operated closure 71 adjusts the position of the reflector 68 and auxiliary heater 70 with respect to the bimetallic strip 58 moving the auxiliary heater and reflector toward the bimetallic strip when the closure member is down closing the toaster slots 12 and away from the bimetallic strip 58 when the closure member 71 is in its raised position. A rod 81 bears on an eccentric 82, Figures 2 and 3, affixed to the tubular member 74. The lower end of rod 81 is pivotally connected to a laterally extending projection 83 formed integral with the bracket 67. The rod 81 is slidably mounted vertically in a lug 84 affixed to the partition 14 at its upper end contiguous to the concentric cam 82 and is slidably mounted in a hole 85 in the base plate 13 through which the rod 81 extends. The lower end 86 of the rod 81 engages a releasing lever 87 pivotally mounted in chamber 19 upon a downwardly extending bracket 88 and having an upturned end 89, Figures 1 to 3, which engages a lug 90 of a latch 91. The latch 91 is pivotally mounted on the pintle 38' similarly as the latch 37 and is spring-biased by a torsion spring 92. The latch 91 is provided with a hook 93 adapted to engage the portion 42 of the U-shaped member 40 substantially in the same manner as the hook 39 of the latch 37. The hook portion 93 is also provided with a cam-shaped surface 94 and also with a stop 95 adapted to engage the member 20 similarly as the stop 44 of the latch 37.

Referring to Figure 1, with the closure 71 in its lowered position, the release mechanism actuated by the closure member 71 is in the position as shown in Figure 1. When the operator moves the manipulating handle 30 from the dotted position to the solid position as shown, the portion 42 engages the cam surface 94 first and as the handle continues to move downwardly the portion 42 then engages the cam surface 41 respectively of the levers 91 and 37. These levers pivot counter-clockwise against the bias of the springs 92 and 43, and with the handle 30 latched in the position shown beneath the hook 39, the bread carriages are latched in their lower toasting position. The latch 37 may then only be released through the actuation of the timing mechanism to be described later and being released permits the toasting carriage to rise upwardly until the portion 42 engages the hook 93 of the latch 91. Upon raising the closure member 71 to its vertical position actuates the rod 81 downwardly through the cam 82 causing the lower end 86 of the rod to engage the lever 87 moving the upturned end 89 upwardly against the lug 90 which moves the lever 91 counter-clockwise against the bias of the spring 92 unlatching the toasting carriages 25 since the hook 94 of the latch is disengaged from the portion 42 permitting the toasting carriages to pop the toast upwardly under the action of the spring 33.

With the cover 71 in its raised position preferably when it is desired to make crisp or dry toast and/or to lengthen the toasting period, the latch 91 is moved counter-clockwise and out-of-engagement with the portion 42 of the toast carriage mechanism so that as the manipulating handle is moved downwardly, the portion 42 only engages the latch 37 latching the toasting carriage in its toasting position to be subsequently released at the end of a toasting interval by the timing mechanism. Also, as the closure member 71 is maintained in the raised position thereof, the timing mechanism comprising the reflector 69 and auxiliary heater 70 is pivoted in a counter-clockwise direction away from the bimetallic strip 58 increasing the toasting interval whereas with the closure member 71 in its lowered position, as shown in Figure 1, forming a closure for the toast receiving opening 12 causes the timing mechanism comprising the reflector 68 and auxiliary heater 70 to be spring-biased in a clockwise direction by a torsion spring 96 always biasing the rod 81 upwardly so that its upper end is always in operative engagement with the cam 82.

Referring to Figures 5 and 6 another embodiment of the invention is shown in which the closure member 71 has been substituted by separate pivotal covers 97 and 98 to provide closure means for toasting slots 12. The covers 97 and 98 are adapted to be moved toward and away from each other for closing and opening the toasting slots 12, as illustrated in Figure 5. The closures 97 and 98 may be preferably formed integrally with downturned lever arms 99 and 100 formed on opposite ends of closure members 97 and 98 and pivotally mounted for limited arcuate movement as at 101 on opposite ends of the toasting shell 11. The closure members 97 and 98 are normally spring-biased together by a tension spring 102 affixed to the levers 99 and 100 by hooks 103.

A manipulating handle 104 is journaled in the toaster shell 11 on a rod 105 affixed to one end of the handle 104 and having affixed at the opposite end a laterally extending cam-shaped lever 106 adapted to engage complementally formed cam-shaped surfaces 107 and 108 formed respectively on the levers 99 and 100. Also affixed to the rod 105 is a cam 109 operatively engaging a vertically mounted rod 110 mounted for vertical movement in a projection 111 affixed to the inside of the toaster shell 11, as shown in Figure 6. The rod 110 corresponds to the rod 81 of the preferred toaster embodiment of Figures 1 to 4, inclusive. The rod 110 is also connected to the release lever 87 and to the bracket 67 for actuating the reflector 68 and auxiliary heater 70 toward and away from the bimetallic strip 58 in the same manner as is the lever 81 of the preferred embodiment of the toaster shown in Figures 1 to 4 and therefore need not be further described.

When the manipulating handle 104 is rotated to a horizontal position the cam 106 engages cam surfaces 107 and 108 which rotates the slot covers to the open position shown in Figure 5, simultaneously the cam 109 depresses the rod 110 against the bias of the torsion spring 96 which also tends to shift the heater and reflector assembly toward the bimetallic thermostat. When the rod 110 is depressed the lever 87 is rocked on its pivot sufficiently to disengage the latch 91 from the toast carriage latching element 42. As the rod 110 is depressed it also rocks the heater-reflector assembly in a direction to move away from the bimetallic thermostat so as to increase the duration of toasting periods. When the handle 104 is rotated to its vertical position the cam 106 is disengaged from the slot covers 97—98 which are then moved to their closed positions by retaining the spring 102 and the cam 109 is rotated so as to remove its high part from contact with rod 110 which then rises and permits the heater-reflector assembly to approach the bimetallic theremostat and the rod 87 to rock sufficiently to bring the latch 91 into latching position with respect to the toast carriage.

Referring to Figures 3 and 7, main heating elements 112 are spaced on each side of the toast racks 25 within the toasting chamber 16. A main switch 113 is closed by movement of the supporting plate 23 downwardly upon movement of the manipulating handle 30 from the dotted position as shown in Figure 1 to the solid position. Contacts 114 connected together are mounted on a bracket 115 and insulated therefrom, the bracket 115 being affixed to the supporting plate 23 for vertical movement. Complementally formed contacts 116 and 117 are mounted on the portion 20 of the base plate 13 and insulated therefrom and adapted to be engaged by the contacts 114. The contact 116 is connected to the line side as shown in Figure 7 whereas contact 117 is connected to the load side of the toaster circuit, Figure 7. It is therefore obvious that the main switch 113 is closed as the contacts 114 engage complementally formed contacts 116 and 117 when the support 23 of the carriers 25 are moved to toasting position so as to energize the main heaters 112. The switch 113 opens automatically when the latch 37 is unlatched permitting the upward movement of the supporting plate 23 and the discharge of the toast through the slots 12 as the toaster is operated with the slots 12 unclosed or as the latch 37 is unlatched by the timing mechanism with the closures for the toasting slots 12 in either of the embodiments disclosed which permits movement of the supporting plate 23 so that the portion 42 engages the latch hook 93 of the latch 91 disconnecting the heating elements 112 from the line at the end of the toasting cycle, and final release of the toasting carriages 25 upwardly to discharge the toast through the slots 12 is accomplished upon the closure members for the toasting slots 12 being opened which permits release of the latch 91 from the portion 42, as previously described.

An auxiliary normally open micro-switch 118 is connected in series with the secondary heater 70 and a rheostat 119, and these elements are parallel connected with the main heaters 112. The switch 118 is closed to energize the auxiliary heater 70 by the upper end 64 of the frame 53 when in the position shown in Figure 1. When the end 64 moves to the right or in the clockwise direction as viewed in Figure 1, the switch 118 will open automatically to deenergize the auxiliary heater 70. The micro-switch 118 in each of the modifications is supported from the supporting member 76.

Referring to Figure 7, it will be apparent that the main heaters 112 will be energized when the switch 113 is closed by the contacts 114 engaging the contacts 116 and 117. The auxiliary heater 70 is controlled by the normally open circuit micro-switch 118 which is in series with the main switch 113. In both embodiments of the invention variation in toasting time is accomplished by adjustment of rheostat 119 regardless of the condition of the toast slot closure means. The rheostat 119, Figures 1 to 7, is adjusted by a control knob 120 journalled on the plastic base 10 of the toaster.

The operation of each embodiment of the invention utilizing the electrical circuit of Figure 7 will now be described. The operation of the toasting mechanism of Figures 1 to 4 and 7 is as follows: Assuming that the toaster is cold and the operator desires dark toast, slot cover 71 is raised to open position. Movement of the slot cover 71 to open position actuates the rod 81 through the cam 82 to shift the auxiliary heater 70 and reflector 68 away from the bimetallic strip 58. The rod 81 also actuates the arm 87 to rock the latch 91 to inoperative position in which it can not engage the toast carriage. The rheostat 119 is then adjusted so that a minimum quantity of current is supplied to the auxiliary heater thus assuring a maximum timing interval.

At this time, the bread carriers will be held in their upper bread receiving position by the spring 33. Bread slices will be inserted through the openings 12 so as to rest on the carriers 25. The handle 30 will then be grasped and moved to its lowermost position which will move the bread carriers to toasting position. The cam surface 41 on the latch 37 will be contacted by the portion 42 of the loop 40 carried by the support 23 which will cause the latch 37 to move to counterclockwise position, as viewed in Figure 1, against the bias of its spring 43. When the part 42 passes the edge of the hook 39, the latch will snap to the position shown in Figure 1 under the bias of the spring 43 so that the hook 39 will overlie the part 42 and latch the carriers in toasting position.

At this time, the bimetallic strip 58 will be cooled and bowed away from the frame 53, as shown by full lines of Figure 1, so as to permit the spring 56 to hold the frame 53 against the end of the rod 46 and press the rod against the end 45 of the latch 37 in opposition to the bias of the spring 50. The end 64 of the lever 53 will also be operable to close the switch 118.

Movement of the carrier 25 to toasting position will cause the switch 113, Figure 7, to close which accordingly will simultaneously energize the main heaters 112 and the auxiliary heater 70.

At this time, the entire toaster is cold as is the timer 52. The heat from the heaters 112 and the auxiliary heater 70 will gradually increase the temperature of the toaster as a whole as well as the temperature of the timer 52 until the toasting chamber 16 reaches a toasting temperature and the toasting operation will begin. Heat which is radiated directly from the heater 70 to the bimetallic strip 58 and also reflected thereto by the reflector 68 will gradually increase the temperature of the bimetallic strip 58 so that it will tend to straighten. Since the central portion of the strip 58 is substantially fixed by the link 80 relative to the pivot 54, the straightening of the bimetallic strip 58 will cause the frame 53 to move gradually in a clockwise direction, as viewed in Figure 1. This will cause its impact end 57 to move to the left and will also permit the rod 46 to move to the left under the bias of the spring 50 until the bimetallic strip assumes a substantially straight position but it will snap the frame 53 across its dead center position to the dotted line position shown in Figure 1 which will move the impact end 57 of the frame 53 out-of-contact with the end of the rod 46.

Since the thermostat 61 is cold at the start of a toasting operation it applies a comparatively small compressive force to the end of the bimetal 58 consequently the bimetal 58 snaps over center at a lower temperature than would be the case if the bimetallic element 51 were warm and applied a greater compressive force to the bimetal 58.

Movement of the frame 53 past its dead center position to the position shown in the dotted lines of Figure 1 will cause the end 64 to move away from the switch 118 so that the switch 118 automatically opens and deenergizes the auxiliary heater 70 so as to permit the bimetallic strip 58 to cool.

As the bimetallic strip 58 cools, it will again tend to straighten from the dotted position shown in Figure 1 so as to move the frame 53 in a counter-clockwise direction. This will continue until the frame 53 moves back to its dead center position at which time the combined action of the bimetallic strip 58 and the spring 56 will quickly snap the frame 53 to its full line position shown in Figure 1. This will cause the impact end 57 to contact the end of the rod 46 with a sort of hammer blow forcing the rod to the right. The right hand end of rod 46 will contact the impact end 45 of the latch 37 also with a hammer blow of sufficient force to move the latch 37 in a counter-clockwise direction as viewed in Figure 1 and move the hook 39 away from above the portion 42 of the lug 40. This will permit the spring 33 to move to the support 23 and the carriers 25 to their uppermost position. This will cause the contacts 114 of the switch 113 to move out-of-contact with the contacts 116 and 117 automatically opening the switch 113 and deenergizing the main heaters 112 to end the toasting interval.

When the portion 42 of the lug 40 clears the hook 39 of the latch 37, the spring 43 will move the latch 37 in a clockwise direction as viewed in Figure 1 to the position shown in Figure 1 where the stop 44 is in contact with the end 20 of the plate 13. The rod 46 will move to the left under the bias of the spring 50 and accordingly move the frame 53 slightly to the left of the position shown in Figure 1 against the force of the spring 56 placing the mechanism in condition for the next succeeding toasting operation.

Since the bimetallic strip 58 was cooled to a predetermined low temperature before the toasting period was ended, it will be in a fairly cool condition ready for the next succeeding toasting operation. It has been found that thermal timers have a tendency to over-compensate due to the heat stored in them; but, since the U-shaped bimetallic strip 61 is also hotter than when the toaster is operated from cold position, it applies a greater compressive force to the thermostat 58 so that it must be heated to a higher temperature to snap over center to deenergize the heater 70. In this way the thermostat 61 counteracts the over-compensating characteristic of the thermostat 58 and provides proper timing control of the mechanism.

If now the operator desires a second cooking operation, bread slices are again inserted through the opening 12 as before and the manipulating knob 30 moved to downward position. The device will operate as before except that in this case the toasting chambers are substantially in toasting temperature and immediately the main switch 113 is closed, the toasting operation will begin. Since the bimetallic strip 58, the auxiliary heater 70, and the reflector 68 are also hotter than when the toaster was initially operated, it will take less time for the bimetallic strip to move past its dead center position to the dotted position of Figure 1 so as to deenergize the auxiliary heater 70. Thus the time for heating up the bimetallic strip to a predetermined high temperature will be less for the second operation than for the first, but the time for its movement from the dotted line position of Figure 1 will be substantially the same as before. Thus, the only variant is the time it takes to heat up the bimetallic strip 58 so that it will snap to its dotted line position of Figure 1.

If the operator desires lighter toast, he moves the manipulating knob 120 of the rheostat 119 counter-clockwise as shown in Figure 7 reducing the resistance of the secondary heater circuit to increase the flow of current through the secondary heater in order to decrease the time it takes to heat the bimetallic strip 58 to its predetermined high temperature. Again, the only variant in adjusting for light, medium, or dark toast is the time it takes to heat the bimetallic strip 58 from its cold to its hot position since the time it takes the bimetallic strip 58 to cool is substantially the same for all adjustments of the control knob 120 of the rheostat 119.

*Toast cycle with slots uncovered*

In this cycle, the handle 30 is pushed down and latched by the primary latch 37. The switch, Figure 7, is closed causing the main heaters 112 and the secondary heater 70 to be energized. The cam 82 of the preferred embodiment, Figures 1 to 4, inclusive, rides on the rod 81 so that the secondary heater 70 is at the maximum position toward the left in Figure 1. The toasting cycle is therefore longer when the slots are uncovered and/or the closure means are opened because a longer time is required to toast the bread when that condition exists. When the auxiliary heater 70 has been on for a sufficient length of time to heat the bimetallic strip 58, it moves in the manner previously described above in detail for the actuation of the complete timing mechanism 52 and the impact end 57 moves to the left as shown in the dotted line of Figure 1. When this happens, the micro-switch 118 operates deenergizing the secondary heater 70 allowing the bimetallic strip 58 to cool off. When the bimetallic strip cools beyond a certain point, a snap action occurs causing the member 57 to strike the reciprocating rod 46 which in turn moves the latch 37 releasing the carriages 25. The length of the toasting cycle is controlled by the rheostat 119 through the control knob 120. When the toaster is operated with the slot covers and/or closure member 71 opened, the cam 82 is in such a position that the rod 81 and, in the modification of Figure 5, the rod 110 moves the latch 91 back allowing the toaster carriage to be released, when the toaster timer mechanism 52 has completed its operation.

The operation of the form of the invention of Figures 5 and 6 with the slot covers in open position is identical with that described above with respect to Figures 1 to 4 except in the following particulars. In this form of the invention the handle 104 is rotated to actuate the slot covers 97 and 98 to open position and to operate the rod 110 which shifts the heater-reflector mechanism away from the thermostat and disengages the latch 91 in the same manner in which these functions are performed by the rod 81 in the form of the invention of Figures 1 to 4. In all other respects the operation is the same for the two forms of the invention.

When it is desired to operate the toaster with the slots covered to make soft toast the cover 71 is manually moved to closed position in the form of the invention shown in Figures 1 to 4 or the handle 104 is moved to vertical position in the form of the invention illustrated in Figures 5 and 6. This action rotates the cam 82 and 109 to permit the rods 81 and 110 respectively to move upwardly under the bias of spring 96 in both forms of the invention. When this happens the latch 91 is permitted to move to operative position to engage the keeper 42 on the toast carriage and the spring 96 is permitted to shift the heater-reflector assembly toward the bimetallic thermostatic element which tends to shorten up the toasting intervals.

In either of these embodiments with the toaster operating with the toaster slots 12 covered, the carriage 25 moves upwardly upon release of the latch 37 through the timing mechanism 52 a sufficient distance to open the main switch 113 and turn off both the main heater 112 and secondary heater 70. Beyond this point, however, the carriage 25 is halted by the upper latch 91 thus preventing crushing of the toast between the rising carriage and the closed slot covers. The toast will remain in the toaster and be kept warm for a reasonable period. When it is desired to remove the toast, the operator opens the slot covers as previously described for each of the embodiments of the invention thus releasing the upper latch 91 which permits the toast to pop up.

It is also within the scope of the invention that the mechanism of the modification of the invention as shown in Figures 5 and 6 particularly with respect to the manipulating handle 104 and the cam 109 in conjunction with the rod 110 and the timing mechanism 52 of the invention may be used without the slot covers 97 and 98 for the toaster slots 12. When used in this manner with the handle 104 in a vertical position, the latch 91 is positioned as in Figure 1 so that upon release of the latch 37, the toaster carriage 25 will remain in its lowered position after the completion of the toasting cycle maintaining the toast in a warmed condition until it is ready to be eaten whereupon the control handle 104 may be moved to the horizontal position shown in Figure 6 releasing the latch 91 and ejecting the toast.

From the foregoing, it is obvious that this invention provides a toaster comprising a novel timer mechanism in combination with closure means for the toaster slots of the toasting chamber in which the operator may make crisp or dry toast when desired with the closure members for the toaster chamber opened by raising the cover in the embodiment of Figure 1 or by angular movement of the covers in the embodiment of Figures 5 and 6; and also, a toaster in which soft toast may be made when the closures for either of the embodiments of the invention are kept closed, the time control for the toaster timer mechanism of this invention being automatically changed by movement of the closure means for the toasting chamber from open to closed position depending upon whether dry or soft toast is desired. Furthermore, the operator can obtain toast of any degree of brownness by merely manipulating a manual knob varying the current through a rheostat in series with a secondary heater to vary the time of the toasting period. Toast of any degree of brownness either with the closures for the toasting chambers opened or closed may be obtained by varying the time of the toasting period by manipulating the rheostat controlling the flow of current to the auxiliary heater of the timing mechanism. In addition, the toaster is always reliable in operation because the bimetallic element is always in a properly cooled condition at the initiation of any particular toasting operation whether the toaster is operated with the closures in position covering the toasting slots or the toasting slots are opened and movement of the timer to its terminating position imparts an impact or hammer blow to the latch so that the latch is always positively released to terminate the toasting operation.

It is also evident that this invention provides a toaster in which there is provided a reduced toasting period with the slots for the toaster chamber closed, the bread is toasted uniformly and the toast retains moisture better for soft toast with the slots closed. A toaster is also provided by this invention in which the ability to retain heat is obtained with the cover for the toasting chamber closed thus speeding up the time for toasting or with a toaster with covers as herein disclosed, the necessary power required for toasting may be cut down. The closures for the toaster chamber also keep the toast warmer longer when used with the feature of holding the toast down for a period of time before removing as herein disclosed. Covering the toaster chamber also serves to change the properties of the toast in the way of moisture content which is desired if soft toast is preferred and if dry toast is preferred as herein disclosed, the closure for the toasting chamber may be opened.

While there has been shown but two embodiments of the invention, it is to be understood that these embodiments are to be taken as illustrative only and not in a limiting sense. It will, of course, be understood that various changes may be made in the form, details, arrangement and proportions of the parts, without departing from the scope of the invention which may be generally stated comprises a device and/or toaster capable of carrying out the objects above set forth in the parts and combinations of parts disclosed and defined in the appended claims.

What is claimed is:

1. The combination in a toaster comprising a central toasting chamber, a toast carrier in said toasting chamber movable from an upper bread receiving position to a lower toasting position and being spring-biased to the bread receiving position, of a closure for the toasting chamber, latching means for latching the toast carrier in its toasting position, timing means for releasing the toast carrier at the end of the toasting interval, said timing means comprising means for varying the period of the timing means depending upon whether the toaster is operated with the toasting chamber opened or closed, actuating means operatively connecting the closure and the aforesaid last mentioned means whereby the toasting interval is varied depending upon whether the closure for the toasting chamber is opened or closed, second latching means adapted for retaining the toast carrier in the toasting chamber when the closure for the toasting chamber is closed, and release means for the second latching means operatively connected to the aforesaid actuating means whereby the second latching means is adapted to be disengaged from the toast carrier with the closure for the toast chamber open and adapted to be unlatched from the toast carrier upon the closure for the toasting chamber being opened.

2. The combination in a toaster comprising a central toasting chamber, a toast carrier in said toasting chamber movable from an upper bread receiving position to a lower toasting position and being spring-biased to the bread receiving position, of a closure for the toasting chamber, latching means for latching the toast carrier in its toasting position, timing means for releasing the toast carrier at the end of the toasting interval, said timing means comprising means for varying the period of the timing means depending upon whether the toaster is operated with the toasting chamber opened or closed, actuating means operatively connecting the closure and the aforesaid last mentioned means whereby the toasting interval is varied depending upon whether the closure for the toasting chamber is opened or closed, second latching means operatively connected to the toast carrier whereby the toast carrier is adapted to be latched downwardly with the closure member for the toasting chamber closed and adapted to unlatch the toast carrier when the cover for the toasting chamber is opened, said first mentioned latching means adapted to latch the toast carrier in the toasting chamber as the toast carrier is moved downwardly therein and also adapted to release the toast carrier for upward movement at the end of a predetermined time interval controlled by the aforesaid timing means, the second latching means adapted to retain the toast carrier within the toasting chamber upon release thereof by the first mentioned latching means at the end of a predetermined time interval, and said second latching means adapted to be unlatched from the toast carrier upon the closure for the toasting chamber being opened.

3. A toaster comprising a casing divided into a central toasting chamber, front and rear mechanism compartments and a bottom compartment beneath said toasting chamber, a bread carrier in said toasting chamber movable from an upper bread receiving position to a lower toasting position and being spring-biased to a bread receiving position, manual means extending to said front mechanism compartment for moving said carrier to toasting position, a closure adapted to cover and open the toasting chamber, a first latch means in said front mechanism compartment for holding said carrier in toasting position, a second latch means in said front mechanism compartment for holding said carrier within the toasting chamber upon release by the first mentioned latch means at the end of a predetermined toasting interval, a timing mechanism located in said rear mechanism compartment, means located in said bottom chamber for transmitting movement from said timing mechanism to said first mentioned latch means, actuating means operatively connected to the closure to move the same to open and closed positions, means located in said bottom chamber for transmitting movement of the aforesaid actuating means to said second latch means to move said second latch means to release position when said closure is moved to open position.

4. The combination in a toaster having a toasting chamber, a movable bread carrier mounted therein, of a closure for the toasting chamber movable to open and closed positions, a latch for holding said bread carrier in toasting position, an impact member movable in one direction to release said latch, timing mechanism including a snap-acting mechanism for imparting an impact to said impact member so as to release said latch a predetermined interval after movement of said carrier to toasting position, a second latch means for holding said bread carrier upon release by the first mentioned latch, means operated by the closure member to vary the operation of said timing mechanism whereby the duration of toasting operation is one predetermined time interval with the toasting chamber covered and another predetermined time interval with the toasting chamber uncovered, and means operated by said closure to unlatch the second latch means upon movement of the closure member from its closed to its opened position.

5. A toaster comprising a bread carrier movable from an upper bread receiving position to a lower toasting position and spring-biased to upper bread receiving position, manual means for moving said carrier into toasting position, main heating means, a switch actuated by movement of said carrier to toasting position for energizing said main heating means, a thermal timer for opening said switch at the end of each toasting interval, said timer including a thermally responsive element and an auxiliary heater therefor, a closure for said toaster, and means operatively connected to the closure upon movement of the closure from its opened or closed position adapted for moving said auxiliary heater toward and away from said thermally responsive element to vary the time of the toasting interval in the opened or closed positions of the closure of the toaster.

6. A toaster comprising a toasting chamber, a bread carrier movable from an upper bread receiving position to a toasting position within the toasting chamber, main heating means for heating the toasting chamber, a latch for holding said carrier in toasting position within the toasting chamber, closure means for the toasting chamber, a thermal timer for releasing said latch at the end of each toasting interval adapted to de-energize the heating means, said timer including a thermally responsive element, an auxiliary heater therefor and a reflector for directing heat from said heater to said thermally responsive element, said heater and reflector being movable toward and away from said thermally responsive element, and said closure means operatively connected to said heater and reflector whereby upon actuation of the closure means for opening and closing the toasting chamber, the heater and reflector are adapted to be moved toward and away from said thermally responsive element so that when the toasting chamber is closed by the aforesaid closure means the heater and reflector are moved toward the thermally responsive element shortening the timing interval and when the closure means are actuated to uncover the toasting chamber the heater and reflector are movable away from the thermally responsive element for lengthening the timing interval.

7. A toaster comprising a bread carrier movable from an upper bread receiving position to a lower toasting position and spring-biased to the upper bread receiving position, manual means for moving said carrier to toasting position, a toasting chamber for receiving the bread carrier, a closure for said toasting chamber movable to open or closed position, means for latching said carrier in toasting position, a thermal timer for releasing said latch at the end of each toasting interval, said timer including a thermally responsive element and a heater therefor, said heater being movable toward and away from said thermally responsive element, means operatively connecting the closure means to the aforesaid heater for moving said heater toward the thermally responsive element as the closure is moved to closed position and away from the thermally responsive element as the closure is moved to open position, means for retaining the carrier in toasting position after release by said latching means, and means actuated by said closure for releasing said retaining means when said closure is in open position.

8. The combination in a toaster comprising a toasting chamber, a bread carrier movable from a bread receiving position to a toasting position within the toasting chamber, heating means for the toasting chamber, closure means for the toasting chamber adapted to be movable into and out of closing position with respect to the toasting chamber, operator-operable means for moving the bread carrier into toasting position, a plurality of latching means adapted to latch the bread carrier in toasting position within the toasting chamber, timing means operably connected to one of said latch means whereby the bread carrier is adapted to be released from one position thereof within the toasting chamber and to be reengaged and latched in another position within the toasting chamber, and means operable upon movement of the closure means whereby said second mentioned latch means is unlatched permitting the bread carrier to move to its original bread receiving position.

9. In a toaster, an oven, means for heating said oven, a bread carriage movable between toasting and bread receiving positions in said oven, closure means for said oven movable between open and closed positions, means operated by movement of said carriage to toasting position for energizing said heating means, a first latch for retaining said carriage in toasting position with said heating means energized by said energizing means, a second latch positioned to retain said carriage in said oven above the position in which it operates said energizing means to energize said heating means, timing means for determining the duration of a toasting operation arranged to release said first latch to terminate a toasting operation and to deenergize said heating means, and means interconnecting said closure means and said second latch to move said second latch to carriage release position when said closure is in open position.

10. In a toaster, an oven, means for heating said oven, a bread carriage movable between toasting and bread receiving positions in said oven, closure means for said oven movable between open and closed positions, means operated by movement of said carriage to toasting position for energizing said heating means, a first latch for retaining said carriage in toasting position with said heating means energized by said energizing means, a second latch positioned to retain said carriage in said oven above the position in which it operates said energizing means to energize said heating means, timing means for determining the duration of a toasting operation arranged to release said first latch to terminate a toasting operation and to deenergize said heating means, and means interconnecting said closure means and said second latch to move said second latch to carriage release position when said closure is in open position, and means for varying the operation of said timing means independently of the position of said closure means to vary the duration of a toasting operation.

11. In a toaster, an oven, means for heating said oven, a bread carriage movable between toasting and bread receiving positions in said oven, closure means for said oven movable between open and closed positions, means operated by movement of said carriage to toasting position for energizing said heating means, a first latch for retaining said carriage in toasting position with said heating means energized by said energizing means, a second latch positioned to retain said carriage in said oven above the position in which it operates said energizing means to energize said heating means, timing means for determining the duration of a toasting operation arranged to release said first latch to terminate a toasting operation and to deenergize said heating means, and means interconnecting said closure means and said second latch to move said second latch to carriage release position when said closure is in open position, and means for varying the operation of said timing means independently of the position of said closure means to vary the duration of a toasting operation, and means interconnected with said closure means for adjusting said timing means independently of the operation of said varying means to increase or decrease the duration of a toasting operation with said closure means in open or closed position, respectively.

12. A toaster comprising toasting oven substantially completely enclosed except for bread receiving slots, means for heating said oven, manually operated means for energizing said heating means to initiate a toasting operation, a closure mounted for movement from a first position in which said slots are open to a second position in which said slots are closed and said oven is substantially completely sealed from the air surrounding the toaster, timing means for deenergizing said heating means to terminate a toasting operation, said timing means including adjustable means for altering the timing period of the timing means, and means interconnecting said closure and said adjustable means to set said adjustable means to shorten and lengthen the timing period of said timing means when said closure is moved to closed and open positions, respectively.

WILLIAM H. KITTO.

REFERENCES CITED

The following references are of record in the file of this patent:

UNITED STATES PATENTS

| Number | Name | Date |
| --- | --- | --- |
| 1,809,112 | Criner | June 9, 1931 |
| 2,165,204 | Anderson | July 11, 1939 |
| 2,194,859 | Malmquist et al. | Mar. 26, 1940 |
| 2,271,485 | Koci | Jan. 27, 1942 |
| 2,274,190 | Cramer | Feb. 24, 1942 |
| 2,302,117 | Gomersall | Nov. 17, 1942 |
| 2,339,183 | Myers | Jan. 11, 1944 |
| 2,344,842 | Weeks | Mar. 21, 1944 |
| 2,388,641 | Myers | Nov. 6, 1945 |
| 2,412,727 | Gomersall et al. | Dec. 17, 1946 |
| 2,414,325 | Newell | Jan. 14, 1947 |
| 2,414,396 | Sardeson | Jan. 14, 1947 |
| 2,436,735 | Walder et al. | Feb. 24, 1948 |